United States Patent
Nakano

(10) Patent No.: US 9,617,404 B2
(45) Date of Patent: Apr. 11, 2017

(54) RUBBER COMPOSITION, CONVEYOR BELT RUBBER COMPOSITION, CONVEYOR BELT, AND BELT CONVEYOR DEVICE

(71) Applicant: BRIDGESTONE CORPORATION, Chuo-ku, Tokyo (JP)

(72) Inventor: Hiroki Nakano, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/891,757

(22) PCT Filed: May 12, 2014

(86) PCT No.: PCT/JP2014/002497
§ 371 (c)(1),
(2) Date: Nov. 17, 2015

(87) PCT Pub. No.: WO2014/188677
PCT Pub. Date: Nov. 27, 2014

(65) Prior Publication Data
US 2016/0122519 A1 May 5, 2016

(30) Foreign Application Priority Data
May 23, 2013 (JP) .................. 2013-109374

(51) Int. Cl.
*C08L 9/00* (2006.01)
*C08K 5/30* (2006.01)
*C08K 5/3415* (2006.01)
*B65G 15/32* (2006.01)
*C08L 7/00* (2006.01)

(52) U.S. Cl.
CPC ............... *C08L 9/00* (2013.01); *B65G 15/32* (2013.01); *C08K 5/30* (2013.01); *C08K 5/3415* (2013.01); *C08L 7/00* (2013.01)

(58) Field of Classification Search
CPC .... C08L 9/00; C08L 7/00; C08K 5/30; C08K 5/3415; B65G 15/32
See application file for complete search history.

(56) References Cited

U.S. PATENT DOCUMENTS 6,506,849 B1 1/2003 Hojo et al.
2002/0077423 A1 6/2002 Sugimoto et al.

FOREIGN PATENT DOCUMENTS

| AU | 2007273485 | * | 1/2008 | ................ C08L 7/00 |
| JP | 2000239442 A | | 9/2000 | |
| JP | 2004217726 A | | 8/2004 | |
| JP | 2009-298542 A | | 12/2009 | |
| JP | 2010-095584 A | | 4/2010 | |
| WO | 2008/007733 A1 | | 1/2008 | |

OTHER PUBLICATIONS

Machine translation of JP 2009-298542. Jun. 2008.*
Jul. 22, 2014, International Search Report issued in International Patent Application No. PCT/JP2014/002497.
Jun. 24, 2014, Notification of Reasons for Refusal issued by the Japan Patent Office in the corresponding Japanese Patent Application No. 2013-109374.
Datta, R. N. et al., "Comparative Studies on the Crosslinking Reaction of Bis-Maleimides and Bis-Citraconimides in Squalene and Natural Rubber", Rubber Chemistry and Technology, 1998, vol. 71, pp. 1073-1086.

* cited by examiner

*Primary Examiner* — John Uselding
(74) *Attorney, Agent, or Firm* — Kenja IP Law PC

(57) ABSTRACT

A rubber composition that can improve the productivity of a conveyor belt, belt conveyor device, or the like without impairing its energy saving performance and a conveyor belt and belt conveyor device that have both high productivity and high energy saving performance are provided. The rubber composition includes a diene polymer, a citraconimide compound, a hydrazone compound, and a vulcanization accelerator.

4 Claims, No Drawings

RUBBER COMPOSITION, CONVEYOR BELT RUBBER COMPOSITION, CONVEYOR BELT, AND BELT CONVEYOR DEVICE

TECHNICAL FIELD

The disclosure relates to a rubber composition, a conveyor belt rubber composition, a conveyor belt, and a belt conveyor device.

BACKGROUND

Belt conveyor devices are used as item transportation means in various industrial fields such as steel, coal, and cement. As many belt conveyor devices are required to be of very long distance nowadays, there is strong demand for conveyor belts having higher energy saving performance.

To satisfy such demand, various conveyor belt rubber compositions have been used conventionally. For example, Patent Literature (PTL) 1 discloses the following conveyor belt rubber composition. Natural rubber (NB) and polybutadiene rubber (BR) are used in combination as the rubber component, to which carbon black having a predetermined nitrogen adsorption specific surface area and dibutylphthalate oil absorption is added, thus reducing power consumption while maintaining favorable basic physical properties as a conveyor belt.

CITATION LIST

Patent Literature

PTL 1: JP 2010-95584 A

SUMMARY

Technical Problem

If the vulcanization of the above-mentioned rubber composition is continued even after an optimal vulcanization degree is reached, however, the properties thereof rapidly decrease with time. Hence, for example in the case of performing vulcanization at higher temperature for the purpose of shorter manufacturing time and the like, it is usually difficult to finely adjust the vulcanization degree, and excessive progress of vulcanization seriously degrades the low loss property and significantly reduces the energy saving effect. Besides, in the case where the conveyor belt to be manufactured is thicker, it takes more time for the inner layer portion to reach a predetermined vulcanization degree during vulcanization. As a result, the vulcanization of the rubber surface progresses excessively, which seriously degrades the low loss property and significantly reduces the energy saving effect. To avoid such performance degradation, vulcanization at low temperature is necessary. That is, there is a problem of being unable to improve conveyor belt productivity.

It could therefore be helpful to provide a rubber composition that can improve the productivity of a conveyor belt, belt conveyor device, or the like without impairing its energy saving performance, and a conveyor belt and belt conveyor device that have both high productivity and high energy saving performance.

Solution to Problem

We provide the following.

A rubber composition includes a diene polymer, a citraconimide compound, a hydrazone compound, and a vulcanization accelerator.

Advantageous Effect

It is thus possible to provide a rubber composition that can improve the productivity of a conveyor belt, belt conveyor device, or the like without impairing its energy saving performance. It is also possible to provide a conveyor belt and belt conveyor device that have both high productivity and high energy saving performance.

DETAILED DESCRIPTION

The following describes one of the disclosed embodiments in detail.

The disclosed rubber composition includes a diene polymer, a citraconimide compound, a hydrazone compound, and a vulcanization accelerator.

(Rubber Component)

The rubber composition includes a diene polymer as a rubber component. Examples of the diene polymer include, but are not particularly limited to, natural rubber, polyisoprene rubber, polybutadiene rubber, styrene-butadiene rubber, chloroprene rubber, ethylene-propylene-diene copolymers, and acrylonitrile-butadiene rubber. As the rubber component, these diene polymers may be used singly or in combination of two or more types. The rubber component preferably includes at least natural rubber and polybutadiene rubber, and more preferably includes only natural rubber and polybutadiene rubber.

In the case where natural rubber and polybutadiene rubber are included as the rubber component, the proportion of the content of the natural rubber to the total content of the natural rubber and polybutadiene rubber is preferably 15% to 65% by mass, more preferably 35% to 60% by mass, and particularly preferably 50% to 60% by mass. When the proportion is 15% by mass or more, the natural rubber sufficiently contributes to the properties of the conveyor belt or the like. When the proportion is 65% by mass or less, the polybutadiene rubber sufficiently suppresses degradation in the low loss property of the conveyor belt or the like. Accordingly, the obtained conveyor belt, belt conveyor device, or the like can exhibit higher energy saving performance with no impairment of the properties, even in the case where vulcanization progresses excessively.

The rubber composition may include, in the rubber component, not only the diene polymer but also a non-diene polymer. The non-diene polymer is not particularly limited, and may be a non-diene polymer typically used in rubber products. The content of the diene polymer in the rubber composition is preferably 100% by mass with respect to the total content of the diene polymer and non-diene polymer.

(Citraconimide Compound)

The rubber composition includes a citraconimide compound as an essential component. The citraconimide compound can have a function of crosslinking the molecules of the rubber component in the rubber composition, and also can prevent the rubber composition from reversion and suppress degradation in the properties of the rubber composition even in the case where vulcanization progresses excessively. When used together with the below-mentioned hydrazone compound and vulcanization accelerator, the citraconimide compound can effectively suppress degradation in the properties without losing the vulcanization speed and without degrading the low loss property even in the case where vulcanization progresses excessively.

The citraconimide compound may be, but is not particularly limited to, a biscitraconimide. Examples of the biscitraconimide include 1,2-bis(citraconimidemethyl)benzene, 1,3-bis(citraconimidemethyl)benzene, 1,4-bis(citraconimidemethyl)benzene, 2,3-bis(citraconimidemethyl)toluene, 2,4-bis(citraconimidemethyl)toluene, 2,5-bis(citraconimidemethyl)toluene, 2,6-bis(citraconimidemethyl)toluene, and bis(citraconimideethyl) compounds corresponding to them. As the citraconimide compound, these biscitraconimides may be used singly or in combination of two or more types. To sufficiently achieve the advantageous effects according to the disclosure, it is preferable to use 1,3-bis(citraconimidemethyl)benzene singly.

A commercial product such as "Perkalink 900" (1,3-bis(citraconimidomethyl)benzene) manufactured by Flexsys Inc. may be suitably used as the citraconimide compound.

(Hydrazone compound) The rubber composition includes a hydrazone compound as an essential component. The hydrazone compound can have a function of developing the low loss effect of the rubber composition, and also can prevent the rubber composition from reversion and suppress degradation in the properties of the rubber composition such as the low loss property even in the case where vulcanization progresses excessively. When used together with the above-mentioned citraconimide compound and the below-mentioned vulcanization accelerator, the hydrazone compound can effectively suppress degradation in the properties such as the low loss property when vulcanization progresses excessively, without losing the vulcanization speed.

The hydrazone compound is preferably, but is not particularly limited to, any of the hydrazone compounds expressed by the following formulas (I) to (III).

[Chem. 1]

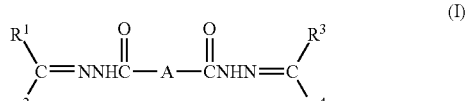

(I)

[Chem. 2]

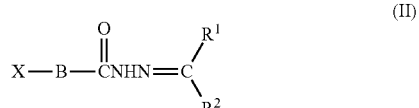

(II)

[Chem. 3]

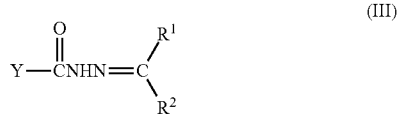

(III)

In the formulas (I) to (III), A denotes a bivalent aromatic ring group (the binding position is not limited and may be any of ortho position, meta position, and para position), a hydantoin ring group, or a saturated or unsaturated linear hydrocarbon group having 0 to 18 carbon atoms (ethylene group, tetramethylene group, heptamethylene group, octamethylene group, octadecamethylene group, 7,11-octadecadienylene group, etc.), B denotes an aromatic group (phenyl group, naphthyl group, etc.), X denotes a hydroxy group or an amino group, Y denotes a pyridyl group or a hydrazino group, and $R^1$ to $R^4$ are each hydrogen or an alkyl group, cycloalkyl group, or aromatic ring (which may have a substituent at any position) having 1 to 18 carbon atoms and may be the same as or different from each other.

Examples of the hydrazone compound expressed by the formula (I) include isophthalic dihydrazide and adipic dihydrazide derivatives such as isophthalic di(1-methylethylidene)hydrazide, adipic di(1-methylethylidene)hydrazide, isophthalic di(1-methylpropylidene)hydrazide, adipic di(1-methylpropylidene)hydrazide, isophthalic di(1,3-dimethylpropylidene)hydrazide, adipic di(1,3-dimethylpropylidene)hydrazide, isophthalic di(1-phenylethylidene)hydrazide, and adipic di(1-phenylethylidene)hydrazide. Other examples include terephthalic dihydrazide, azelaic dihydrazide, succinic dihydrazide, and icosanoic dicarboxylic dihydrazide derivatives. Of these, isophthalic dihydrazide derivatives are preferable in terms of suppressing degradation in the low loss property.

Examples of the hydrazone compound expressed by the formula (II) include 3-hydroxy-2-naphthoic hydrazide derivatives, and also N'-(1,3-dimethylbutylidene)salicylic hydrazide, 4-hydroxybenzoic hydrazide, antranilic hydrazide, and 1-hydroxy-2-naphthoic hydrazide derivatives. The 3-hydroxy-2-naphthoic hydrazide derivatives are, for example, 3-hydroxy-2-naphthoic(1-methylethylidene)hydrazide, 3-hydroxy-2-naphthoic(1-methylpropylidene)hydrazide, 3-hydroxy-2-naphthoic(1,3-dimethylpropylidene)hydrazide, 3-hydroxy-2-naphthoic(1-phenylethylidene)hydrazide, and 3-hydroxy-N'-(1,3-dimethylbutylidene)-2-naphthoic hydrazide. Of these, 3-hydroxy-N'-(1,3-dimethylbutylidene)-2-naphthoic hydrazide is preferable in terms of suppressing degradation in the low loss property.

Examples of the hydrazone compound expressed by the formula (III) include isonicotinic hydrazide derivatives such as isonicotinic(1-methylethylidene)hydrazide, isonicotinic(1-methylpropylidene)hydrazide, isonicotinic(1,3-dimethylpropylidene)hydrazide, and isonicotinic(1-phenylethylidene)hydrazide, and also carbonic dihydrazide derivatives. Of these, isonicotinic hydrazide derivatives are preferable in terms of suppressing degradation in the low loss property.

As the hydrazone compound, these compounds may be used singly or in combination of two or more types. To sufficiently achieve the advantageous effects according to the disclosure, it is preferable to use 3-hydroxy-N'-(1,3-dimethylbutylidene)-2-naphthoic hydrazide singly. A commercial product such as BMH (expressed by the formula (II) where $R^1$ is a methyl group, $R^2$ is an isobutyl group, X is a hydroxy group, and B is a naphthyl group) manufactured by Otsuka Chemical Co., Ltd. may be suitably used as such a compound.

(Vulcanization Accelerator)

The rubber composition further includes a vulcanization accelerator as an essential component. The vulcanization accelerator mentioned here is a vulcanization accelerator typically used as an agent for accelerating the vulcanization of diene polymers. When used together with the above-mentioned citraconimide compound and hydrazone compound, the vulcanization accelerator can increase the vulcanization speed while having the effect of suppressing degradation in the properties such as the low loss property when vulcanization progresses excessively, thus improving the productivity of a conveyor belt or the like.

Examples of the vulcanization accelerator include, but are not particularly limited to, thiuram vulcanization accelerators, substituted dithiocarbamate vulcanization accelerators, guanidine vulcanization accelerators, thiazole vulcanization accelerators, sulfenamide vulcanization accelerators, thiourea vulcanization accelerators, and xanthate vulcanization accelerators. Of these, thiazole vulcanization accelerators and sulfenamide vulcanization accelerators are preferable in terms of sufficiently achieving the advantageous effects according to the disclosure. The vulcanization accelerator can be changed as appropriate based on the other components, and the above-mentioned vulcanization accelerators may be used singly or in combination of two or more types. To sufficiently achieve the advantageous effects according to the disclosure, it is preferable to use a thiazole vulcanization accelerator and a sulfenamide vulcanization accelerator in combination.

Examples of the thiazole vulcanization accelerator include 2-mercaptobenzothiazole, di-2-benzothiazyl-disulfide, zinc salt of 2-mercaptobenzothiazole, cyclohexylamine salt of 2-mercaptobenzothiazole, 2-(N,N-diethylthiocarbamoylthio)benzothiazole, and 2-(4'-morpholinodithio)benzothiazole. Examples of the sulfenamide vulcanization accelerator include N-cyclohexyl-2-benzothiazolylsulfenamide, N-tert-butyl-2-benzothiazolylsulfenamide, N,N-dicyclohexylbenzothiazolylsulfenamide, N,N-diisopropylbenzothiazylsulfenamide, and N-oxydiethylene-2-benzothiazolylsulfenamide.

(Rubber Composition)

As described above, the disclosed rubber composition includes the diene polymer, the citraconimide compound, the hydrazone compound, and the vulcanization accelerator. The disclosed conveyor belt rubber composition is the above-mentioned rubber composition and is used in a conveyor belt, and can improve the productivity of the conveyor belt without impairing its energy saving performance by suppressing degradation in the properties of the conveyor belt such as the low loss property even in the case where the vulcanization of part or all of the rubber composition progresses excessively due to high-temperature heating or the like. The disclosed rubber composition may be used not only in a conveyor belt but also in rubber goods such as a tire.

Regarding a preferable proportion of the content of each of the components, the content of the citraconimide compound is preferably 0.2 parts to 3.0 parts by mass and more preferably 0.5 parts to 3.0 parts by mass, the content of the hydrazone compound is preferably 0.2 parts to 3.0 parts by mass and more preferably 0.5 parts to 3.0 parts by mass, and the content of the vulcanization accelerator is preferably 0.2 parts to 1.5 parts by mass and more preferably 0.5 parts to 1.5 parts by mass, with respect to 100 parts by mass the diene polymer. When each of the components is within the above-mentioned range, the obtained conveyor belt, belt conveyor device, or the like can exhibit higher energy saving performance with no impairment of the properties, even in the case where vulcanization progresses excessively.

When the content of the citraconimide compound is 0.2 parts by mass or more with respect to 100 parts by mass the diene polymer, the effect of suppressing degradation in the properties in the case where vulcanization progresses excessively can be sufficiently attained. When the content of the citraconimide compound is 3.0 parts by mass or less with respect to 100 parts by mass the diene polymer, a significant decrease of the vulcanization speed can be avoided, and also degradation in the low loss property in the case where vulcanization progresses excessively can be suppressed.

When the content of the hydrazone compound is 0.2 parts by mass or more with respect to 100 parts by mass the diene polymer, the effect of suppressing degradation in the properties of the rubber composition such as the low loss property even in the case where vulcanization progresses excessively can be sufficiently attained. When the content of the hydrazone compound is 3.0 parts by mass or less with respect to 100 parts by mass the diene polymer, a significant decrease of the vulcanization speed can be avoided.

When the content of the vulcanization accelerator is 0.2 parts by mass or more with respect to 100 parts by mass the diene polymer, the vulcanization speed can be sufficiently increased to improve the productivity of a conveyor belt or the like. When the content of the vulcanization accelerator is 1.5 parts by mass or less with respect to 100 parts by mass the diene polymer, prevulcanization during kneading and the like caused by an excessive increase of the vulcanization speed can be prevented, and the workability of the rubber composition or the properties of the conveyor belt or the like can be maintained.

(Other Components)

The disclosed rubber composition may further include additives, etc. other than the above-mentioned components as appropriate. Examples of the additives, etc. include vulcanizers such as sulfur, vulcanization accelerators, vulcanization acceleration aids, retarders (scorch retarders), reinforcing fillers such as carbon black and silica, age resistors, plasticizers, petroleum resins, waxes, antioxidants, oils, lubricants, ultraviolet absorbers, dispersants, compatibilizers, and homogenizers. In the case where silica is used as a reinforcing filler, a silane coupling agent may be added to further improve the reinforcement and the low loss property.

The disclosed rubber composition may be, for example, manufactured by kneading the above-mentioned components using a Banbury mixer, a Brabender mixer, a kneader, or the like. The disclosed rubber composition is preferably manufactured by kneading the components other than the above-mentioned citraconimide compound, vulcanizer, vulcanization accelerator, vulcanization acceleration aid, and retarder using a Banbury mixer, a Brabender mixer, a kneader, or the like and then adding the above-mentioned citraconimide compound, vulcanizer, vulcanization accelerator, vulcanization acceleration aid, and retarder and kneading them using a roll kneader or the like.

(Conveyor Belt)

The disclosed conveyor belt uses the above-mentioned conveyor belt rubber composition. In one embodiment, the conveyor belt rubber composition is preferably used in at least the surface layer rubber (lower cover rubber) that is below the reinforcing member made of metal cords or the like and comes into contact with the pulley for driving the belt and the idler for supporting the belt, and may be further used in the surface layer rubber (upper cover rubber) that is above the reinforcing member and comes into contact with the item being transported. The use of the conveyor belt rubber composition in at least the lower cover rubber reduces the running resistance by the pulley and idler and saves the power consumption of the drive motor. A specific example of manufacturing the disclosed conveyor belt is that the reinforcing member is sandwiched between sheets made of the rubber composition, and the rubber composition is heated to pressure-bond and vulcanized-adhere to the reinforcing member so as to coat the reinforcing member. The vulcanization condition in such a case may be selected as appropriate. A preferable condition is typically 140° C. to 180° C. and 10 minutes to 80 minutes. The conveyor belt obtained in this way can be manufactured with high productivity without impairment of energy saving performance, because the properties such as the low loss property can be maintained at high level even in the case where the vulcanization of part or all of the rubber composition progresses excessively due to high-temperature heating or the like and so vulcanization at low temperature is unnecessary.

(Belt Conveyor Device)

The disclosed belt conveyor device includes the disclosed conveyor belt. The belt conveyor device has no limitation except the use of the conveyor belt, and may be manufactured according to an ordinary method. Although the disclosed conveyor belt is applicable to any conventional belt conveyor device, the disclosed conveyor belt is especially suitable for a long-distance belt conveyor device in which, for example, the total length of the load conveyance portion is 1.0 km or more. The belt conveyor device obtained in this way includes the disclosed conveyor belt, and therefore can be manufactured with high productivity without impairment of energy saving performance.

Examples are described below. The disclosure is, however, not limited to the following examples, and may be changed as appropriate without departing from the scope of the disclosure.

EXAMPLES

First, the rubber component and the compounding agents of group A in the composition shown in Table 1 were kneaded using a 1700 ml Banbury mixer, and then the compounding agents of group B were added and kneaded using a roll kneader to prepare each unvulcanized rubber composition. The prepared rubber composition was used to evaluate the vulcanization property and the low loss property of the vulcanized rubber composition by the following method. The results are shown in Table 1.

TABLE 1

| | | | Comparative Example | | | | | | Example | | |
|---|---|---|---|---|---|---|---|---|---|---|---|
| | | | 1 | 2 | 3 | 4 | 5 | 6 | 1 | 2 | 3 |
| Composition | | | | | | | | | | | |
| Rubber component | Natural rubber | pts. mass | 35 | 35 | 35 | 35 | 35 | 35 | 35 | 35 | 35 |
| | Polybutadiene rubber *1 | | 65 | 65 | 65 | 65 | 65 | 65 | 65 | 65 | 65 |
| Group A | Silane coupling agent *2 | | 0.3 | 0.3 | 0.3 | 0.3 | 0.3 | 0.3 | 0.3 | 0.3 | 0.3 |
| | Carbon black FEF | | 15.8 | 15.8 | 15.8 | 15.8 | 15.8 | 15.8 | 15.8 | 15.8 | 15.8 |
| | Carbon black HAF | | 25.0 | 25.0 | 25.0 | 25.0 | 25.0 | 25.0 | 25.0 | 25.0 | 25.0 |
| | Silica | | 4.2 | 4.2 | 4.2 | 4.2 | 4.2 | 4.2 | 4.2 | 4.2 | 4.2 |
| | Hydrazone compound *3 | | — | 0.5 | — | — | 0.5 | — | 0.2 | 3 | 0.5 |
| | Oil *4 | | 2.0 | 2.0 | 2.0 | 2.0 | 2.0 | 2.0 | 2.0 | 2.0 | 2.0 |
| Group B | Sulfur | | 2.2 | 2.2 | 2.2 | 2.2 | 2.2 | 2.2 | 2.2 | 2.2 | 2.2 |
| | Citraconimide compound *5 | | — | — | 0.5 | — | — | 0.5 | 0.5 | 0.5 | 0.2 |
| | Vulcanization accelerator A *6 | | — | — | — | 0.5 | 0.5 | 0.5 | 0.5 | 0.5 | 0.5 |
| | Vulcanization accelerator B *7 | | 0.6 | 0.6 | 0.6 | 0.6 | 0.6 | 0.6 | 0.6 | 0.6 | 0.6 |
| | Zinc flower | | 3.5 | 3.5 | 3.5 | 3.5 | 3.5 | 3.5 | 3.5 | 3.5 | 3.5 |
| | Retarder *8 | | 0.3 | 0.3 | 0.3 | 0.3 | 0.3 | 0.3 | 0.3 | 0.3 | 0.3 |
| Evaluation result | | | | | | | | | | | |
| Vulcanization property | $T_{10}$ | min | 2.1 | 3.5 | 3.9 | 1.3 | 1.6 | 1.6 | 1.6 | 1.8 | 1.5 |
| | $T_{90}$ | min | 5.1 | 6.8 | 7 | 4 | 4.7 | 4.7 | 4.9 | 5.6 | 4.5 |
| | Vulcanization property retention rate | % | 83 | 73 | 75 | 68 | 85 | 84 | 90 | 95 | 89 |
| Low loss property | Index (167° C., 10 min) | ×10$^{-2}$ | 7.76 | 9.82 | 9.95 | 8.06 | 6.98 | 7.46 | 7.23 | 6.82 | 7.02 |
| | Index (167° C., 41 min) | ×10$^{-2}$ | 9.51 | 13.80 | 13.20 | 9.96 | 8.39 | 8.72 | 8.36 | 7.62 | 8.20 |
| | Index increase rate | % | 123 | 141 | 133 | 124 | 120 | 117 | 116 | 112 | 117 |

| | | | Example | | | | | | | |
|---|---|---|---|---|---|---|---|---|---|---|
| | | | 4 | 5 | 6 | 7 | 8 | 9 | 10 | 11 |
| Composition | | | | | | | | | | |
| Rubber component | Natural rubber | pts. mass | 35 | 35 | 35 | 35 | 15 | 25 | 50 | 65 |
| | Polybutadiene rubber *1 | | 65 | 65 | 65 | 65 | 85 | 75 | 50 | 35 |
| Group A | Silane coupling agent *2 | | 0.3 | 0.3 | 0.3 | 0.3 | 0.3 | 0.3 | 0.3 | 0.3 |
| | Carbon black FEF | | 15.8 | 15.8 | 15.8 | 15.8 | 15.8 | 15.8 | 15.8 | 15.8 |
| | Carbon black HAF | | 25.0 | 25.0 | 25.0 | 25.0 | 25.0 | 25.0 | 25.0 | 25.0 |
| | Silica | | 4.2 | 4.2 | 4.2 | 4.2 | 4.2 | 4.2 | 4.2 | 4.2 |
| | Hydrazone compound *3 | | 0.5 | 0.5 | 0.5 | 0.5 | 0.5 | 0.5 | 0.5 | 0.5 |
| | Oil *4 | | 2.0 | 2.0 | 2.0 | 20 | 2.0 | 20 | 20 | 2.0 |

TABLE 1-continued

| | | | | | | | | | | |
|---|---|---|---|---|---|---|---|---|---|---|
| Group B | Sulfur | | 2.2 | 2.2 | 2.2 | 2.2 | 2.2 | 2.2 | 2.2 | 2.2 |
| | Citraconimide compound *5 | | 0.5 | 3 | 0.5 | 0.5 | 0.5 | 0.5 | 0.5 | 0.5 |
| | Vulcanization accelerator A *6 | | 0.5 | 0.5 | 0.2 | 1.5 | 0.5 | 0.5 | 0.5 | 0.5 |
| | Vulcanization accelerator B *7 | | 0.6 | 0.6 | 0.6 | 0.6 | 0.6 | 0.6 | 0.6 | 0.6 |
| | Zinc flower | | 3.5 | 3.5 | 3.5 | 3.5 | 3.5 | 3.5 | 3.5 | 3.5 |
| | Retarder *8 | | 0.3 | 0.3 | 0.3 | 0.3 | 0.3 | 0.3 | 0.3 | 0.3 |
| | Evaluation result | | | | | | | | | |
| Vulcanization property | $T_{10}$ | min | 1.7 | 2.4 | 2.3 | 1.3 | 1.9 | 1.8 | 1.5 | 1.5 |
| | $T_{90}$ | min | 4.7 | 6.1 | 5.2 | 4 | 4.9 | 4.8 | 4.6 | 4.6 |
| | Vulcanization property retention rate | % | 93 | 96 | 90 | 92 | 95 | 95 | 92 | 90 |
| Low loss property | Index (167° C., 10 min) | ×10⁻² | 7.12 | 7.53 | 7.35 | 7.08 | 6.91 | 7.02 | 7.25 | 7.24 |
| | Index (167° C., 41 min) | ×10⁻² | 8.16 | 8.40 | 8.50 | 7.95 | 7.79 | 8.03 | 8.32 | 8.46 |
| | Index increase rate | % | 115 | 112 | 116 | 112 | 113 | 114 | 115 | 117 |

*1 polybutadiene rubber, manufactured by JSR Corporation, "T0700" (made up of cis-1,4-bond unit content: 95% by mass, 1,2-bond unit content: 0.5% by mass, and trans-1,4-bond unit content: 4.5% by mass)
*2 silane coupling agent, manufactured by Evonik Degussa Japan Co., Ltd., "S169"
*3 hydrazone compound, manufactured by Otsuka Chemical Co., Ltd., "BMH", 3-hydroxy-N'-(1,3-dimethylbutylidene)-2-naphthoic hydrazide
*4 oil, manufactured by Nippon Oil Corporation, "Nisseki Mitsubishi Super Oil Y22"
*5 citraconimide compound, manufactured by Flexsys Inc., "Perkalink 900", 1,3-bis(citraconimidomethyl)benzene
*6 vulcanization accelerator A, manufactured by Ouchi Shinko Chemical Industrial Co., Ltd., "Nocceler DM", di-2-benzothiazyl-disulfide (thiazole vulcanization accelerator)
*7 vulcanization accelerator B, manufactured by Ouchi Shinko Chemical Industrial Co., Ltd., "Nocceler NS", N-tert-butyl-2-benzothiazolylsulfenamide (sulfenamide vulcanization accelerator)
*8 retarder, manufactured by Flexsys Inc., "Santogard PVI PDR-D", N-cyclohexylthiophthalimide (1) Vulcanization Property The vulcanization curve of each rubber composition was measured with a temperature condition of 170° C. using a curelastometer "Curelastometer 7" manufactured by JSR Trading Co., Ltd., in conformity with JIS K6300-2:2001. After measuring the maximum value ($F_{max}$) and minimum value ($F_{min}$) of the torque in the vulcanization curve, the time (minutes) for reaching the torque $\{(F_{max}-F_{min})\times 0.1 + F_{min}\}$ was calculated as 10% vulcanization time ($T_{10}$), and the time (minutes) for reaching the torque $\{(F_{max}-F_{min})\times 0.9 + F_{min}\}$ was calculated as 90% vulcanization time ($T_{90}$). Moreover, the vulcanization property retention rate was calculated by dividing the torque ($F_{30min}$) when vulcanization time of 30 minutes elapsed, by $F_{max}$. A higher retention rate indicates a lower rate of degradation in the properties of vulcanized rubber even in the case where vulcanization progresses excessively.

(2) Low Loss Property of Vulcanized Rubber Composition

For the samples of each rubber composition vulcanized with a vulcanization condition of 167° C. and 10 minutes and a vulcanization condition of 167° C. and 41 minutes, the storage elastic modulus (E') and tan δ were measured with a temperature of 20° C., a frequency of 10 Hz, and a distortion of 2% using a viscoelasticity measuring instrument manufactured by Ueshima Seisakusho Co., Ltd., and the obtained measurements were used to calculate "tan δ/E'$^{1/3}$" as an index indicating the low loss property of the rubber composition. A rubber composition with a lower low loss index has more excellent low loss property and so contributes to higher energy saving performance of the conveyor belt. The increase rate of the low loss index of the rubber composition vulcanized with the vulcanization condition of 41 minutes with respect to the rubber composition vulcanized with the vulcanization condition of 10 minutes was calculated, too. A rubber composition with a lower increase rate has a lower rate of degradation in the low loss property even in the case where vulcanization progresses excessively, and so can maintain energy saving performance even when heated at higher temperature or the like to improve conveyor belt productivity.

As can be seen from the results in Table 1, each of the rubber compositions of the examples including a diene polymer, a citraconimide compound, a hydrazone compound, and a vulcanization accelerator has a vulcanization property retention rate of approximately 90% or more which is significantly higher than that of the rubber composition of the comparative example 1, and also has a lower low-loss-property-related index increase rate than the rubber composition of the comparative example 1. This demonstrates that the disclosed rubber composition has a low rate of degradation in the properties of the obtained conveyor belt such as the low loss property even in the case where the vulcanization of part or all of the rubber composition progresses excessively due to higher-temperature heating or the like, and thus can improve productivity without impairing energy saving performance.

As can be seen from the results in Table 1, each of the rubber compositions of the examples has a lower low loss index under the vulcanization condition of 167° C. and 10 minutes than the rubber composition of the comparative example 1. This demonstrates that the disclosed rubber composition contributes to excellent energy saving performance of the obtained conveyor belt even in the case where vulcanization does not progress excessively.

On the other hand, each rubber composition that includes a diene polymer as a rubber component and does not include a citraconimide compound, a hydrazone compound, or a vulcanization accelerator fails to simultaneously achieve a significant increase in vulcanization property retention rate and a decrease in low-loss-property-related index increase rate.

The invention claimed is:
1. A rubber composition comprising:
a diene polymer comprising natural rubber and polybutadiene rubber, wherein a proportion of content of the natural rubber to total content of the natural rubber and the polybutadiene rubber is 15% to 65% by mass;
0.2 parts to 3 parts by mass of a citraconimide compound per 100 parts by mass of the diene polymer;
0.2 parts to 3 parts by mass of a hydrazone compound per 100 parts by mass of the diene polymer; and

0.8 parts to 2.1 parts by mass of a vulcanization accelerator comprising di-2-benzothiazyl-disulfide and N-tert-butyl-2-benzothiazolylsulfenamide per 100 parts by mass of the diene polymer, wherein content of the di-2-benzothiazyl-disulfide is 0.2 parts to 1.5 parts by mass per 100 parts by mass of the diene polymer.

2. A conveyor belt rubber composition comprising the rubber composition according to claim 1.

3. A conveyor belt formed of the conveyor belt rubber composition according to claim 2.

4. A belt conveyor device comprising the conveyor belt according to claim 3.

* * * * *